(12) United States Patent
Endsley et al.

(10) Patent No.: US 7,965,310 B2
(45) Date of Patent: *Jun. 21, 2011

(54) SYSTEM AND CAMERA FOR TRANSFERRING DIGITAL IMAGES TO A SERVICE PROVIDER

(75) Inventors: Jay A. Endsley, Fairport, NY (US); Steven M. Bryant, Holley, NY (US); John R. Fredlund, Rochester, NY (US); Kenneth A. Parulski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1525 days.

This patent is subject to a terminal disclaimer.

(21) Appl. No.: 11/355,431

(22) Filed: Feb. 16, 2006

(65) Prior Publication Data

US 2006/0139474 A1  Jun. 29, 2006

Related U.S. Application Data

(60) Division of application No. 09/718,018, filed on Nov. 20, 2000, now Pat. No. 7,034,880, which is a continuation-in-part of application No. 09/569,079, filed on May 11, 2000, now Pat. No. 6,812,961.

(51) Int. Cl.
*H04N 7/14* (2006.01)

(52) U.S. Cl. ...................................... 348/14.16; 382/133

(58) Field of Classification Search .... 348/14.01–14.16, 348/231.7, 231.5, 211.2, 333.02, 231.1, 207.1, 348/207.99; 382/232

See application file for complete search history.

(56) References Cited

U.S. PATENT DOCUMENTS

| | | | | | |
|---|---|---|---|---|---|
| 5,327,265 | A | * | 7/1994 | McDonald | 358/527 |
| 5,432,871 | A | * | 7/1995 | Novik | 382/232 |
| 5,633,678 | A | * | 5/1997 | Parulski et al. | 348/231.5 |
| 5,696,850 | A | * | 12/1997 | Parulski et al. | 382/261 |
| 5,974,401 | A | * | 10/1999 | Enomoto et al. | 705/40 |
| 6,198,526 | B1 | * | 3/2001 | Ohtsuka | 355/40 |
| 6,324,521 | B1 | * | 11/2001 | Shiota et al. | 705/27 |
| 6,564,056 | B1 | * | 5/2003 | Fitzgerald | 455/435.1 |
| 6,654,051 | B1 | * | 11/2003 | Fujita et al. | 348/231.1 |
| 6,657,658 | B2 | * | 12/2003 | Takemura | 348/207.99 |
| 6,657,702 | B1 | * | 12/2003 | Chui et al. | 355/40 |

(Continued)

FOREIGN PATENT DOCUMENTS

| | | |
|---|---|---|
| EP | 0 860 980 B1 | 2/1998 |
| EP | 0 878 956 B1 | 5/1998 |
| WO | WO 97/42753 | 11/1997 |
| WO | WO 98/12868 | 3/1998 |

*Primary Examiner* — Curtis Kuntz
*Assistant Examiner* — Maria El-Zoobi
(74) *Attorney, Agent, or Firm* — Thomas J. Strouse; Stephen H. Shaw; Eugene I. Shkurko

(57) ABSTRACT

A method and digital camera for capturing images to be provided to a service provider. The camera includes a capture device for capturing digital images; a memory for storing the captured digital images; an interface to a communications device for transmitting the stored images to a service provider; wherein the digital interface automatically transfers images to the network service provider during a specified time period. Rechargeable batteries may be provided for powering the digital camera; wherein the communications device recharges the batteries using the interface. The camera may further include a display for displaying digital files stored in the digital memory and displaying the at least one order status confirmation file on the display.

12 Claims, 8 Drawing Sheets

U.S. PATENT DOCUMENTS

| | | | |
|---|---|---|---|
| 6,715,003 B1 * | 3/2004 | Safai | 348/231.2 |
| 7,408,582 B2 * | 8/2008 | Prabhu et al. | 348/333.05 |
| 7,437,419 B2 * | 10/2008 | Tu et al. | 709/206 |
| 2003/0009527 A1 * | 1/2003 | McIntyre et al. | 709/206 |
| 2003/0142215 A1 * | 7/2003 | Ward et al. | 348/207.1 |
| 2004/0092251 A1 * | 5/2004 | Fell et al. | 455/412.1 |

\* cited by examiner

SYSTEM AND CAMERA FOR TRANSFERRING DIGITAL IMAGES TO A SERVICE PROVIDER

CROSS REFERENCE TO RELATED APPLICATIONS

This is a divisional application of Ser. No. 09/718,018 filed Nov. 20, 2000, now U.S. Pat. No. 7,034,880, which is a continuation-in-part of application Ser. No. 09/569,079, filed 11 May 2000, now U.S. Pat. No. 6,812,961, entitled: "SYSTEM AND CAMERA FOR AUTOMATICALLY FORWARDING DIGITAL IMAGES TO A SERVICE PROVIDER" by Kenneth A. Parulski and John R. Fredlund.

FIELD OF THE INVENTION

The present invention is directed to an apparatus and system for forwarding digital images. More particularly, it is directed to an apparatus and system for transferring images captured by a digital camera to a service provider over a communication network.

BACKGROUND OF THE INVENTION

As prices of digital cameras fall, image quality improves and ease of use increases, more and more consumers will use electronic digital cameras to fill their image capturing needs. Digital electronic cameras offer many benefits. However, they also present some difficulties. In particular, obtaining high quality prints from electronic digital cameras can be difficult.

There are many methods for printing images from electronic cameras. Image files may be transferred to a computer via physically transferring a memory card or by a data link between the computer and the camera. Once the image resides in the memory of the computer, a computer program can be used to print the images on a local printer. Also, a computer may use a modem to transfer images over the phone lines or other communication network to a remote photofinisher wherein images may be printed. While the foregoing methods can be used to obtain prints from the digital image files, they are often time consuming and can often require complex use of a computer.

Another method of getting hard copy prints from digital image files captured by an electronic digital camera is to transfer the digital image files directly to a printer via transferring a memory card or by a data link between the printer and the camera. This approach may have equal appeal according to ease of use, but the quality of the print is limited to the print quality of the local printer. Additionally, the consumer is forced to maintain the printer.

Digital images may also be printed at a retail kiosk where the digital image files are transferred to an internal computer or to a printer by physically transferring the memory card or by transferring the digital data by a data link between the kiosk and camera. The utility of the kiosk is limited by its physical location, thus requiring a specific time for the consumer to access these machines which are typically only accessible during business hours.

As described in commonly-assigned U.S. patent application Ser. No. 09/004,046 filed Jan. 7, 1998 entitled "NETWORK CONFIGURATION FILE FOR AUTOMATICALLY TRANSMITTING IMAGES FROM AN ELECTRONIC STILL CAMERA" to Ward et. al., the disclosure of which is herein incorporated by reference, there exists in the prior art digital electronic cameras that have built-in communication modems. These cameras may be used to send digital image files directly to a photofinisher. However, the camera must be connected to the transmission line for the duration of the transfer of the digital image files, and is of course out of service as a portable image capture device during this time period.

As described in commonly-assigned U.S. Pat. No. 5,666,159 "ELECTRONIC STILL CAMERA WITH PROGRAMMABLE TRANSMISSION CAPABILITY" to Paruiski et. al., the disclosure of which is herein incorporated by reference, there also exists in the prior art cellular phones with built-in camera modules. The cellular modems in these phones may be used for transferring digital image files to a receiver.

The present invention provides a simple and economic solution to the problems of the prior art by providing a digital camera system which allows for automatically transferring digital image data, which is simple in construction and easy to use, and which allows digital prints to be automatically printed by a service provider, and for reprints to be conveniently re-ordered by the user.

SUMMARY OF THE INVENTION

In accordance with one aspect of the present invention there is provided a method for ordering image products or services with respect to stored digital images at a remote location utilizing a communication network comprising:

creating a high resolution image file for an image captured on a device;

transferring a copy of the high resolution image file to a remote service provider over a communication network;

storing a reduced resolution image file corresponding to the high resolution image file on the device;

deleting the high resolution image file from the device;

displaying a reduced resolution image corresponding to the reduced resolution image file on the device; and ordering goods or services with respect to the displayed reduced resolution image using the corresponding transferred copy of the high resolution image file.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
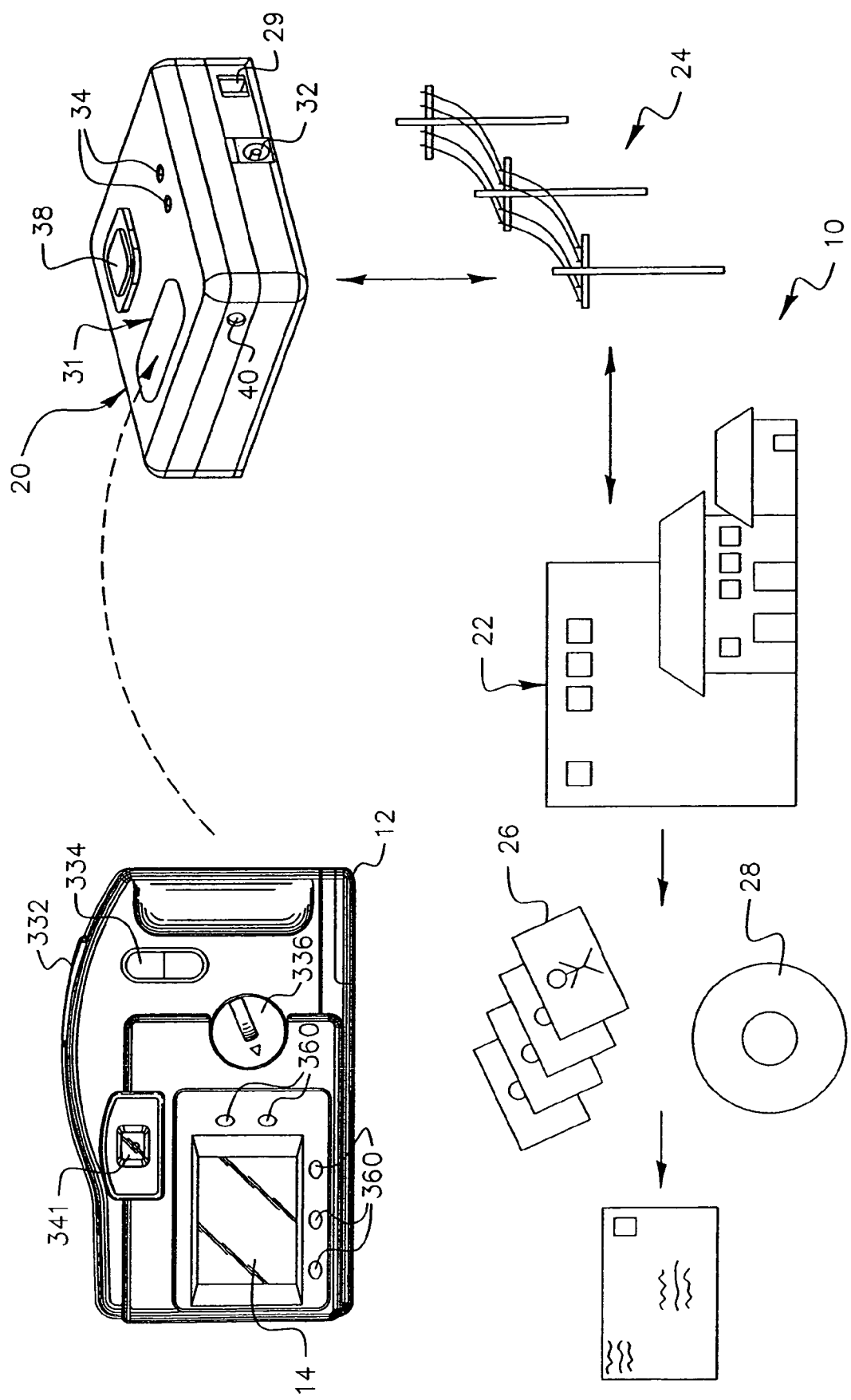
FIG. 1 illustrates in block form a system and apparatus made in accordance with the present invention.
Figure 4:
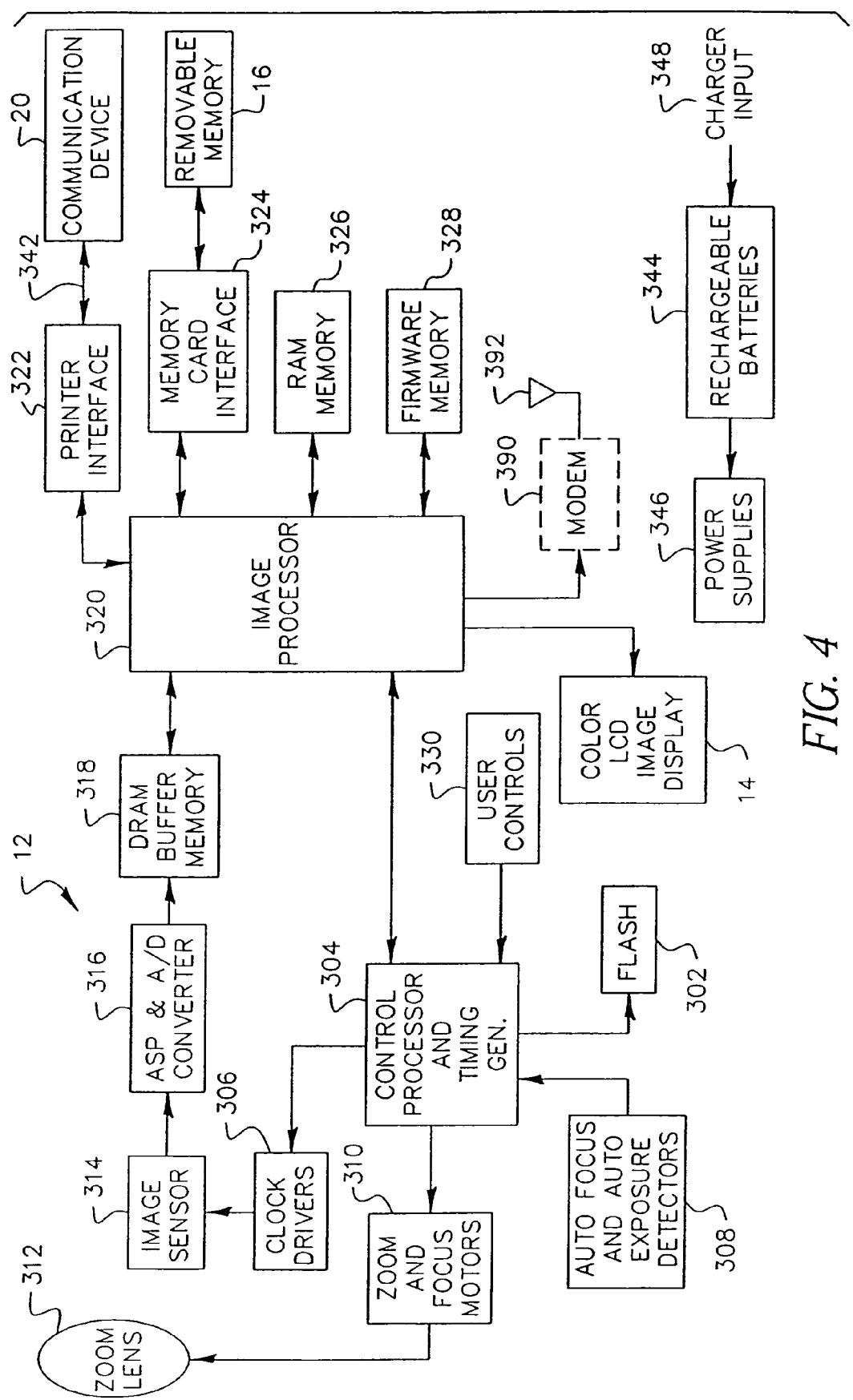
FIG. 4 illustrates in block form the camera depicted in FIGS. 1 and 2.

FIG. 1 illustrates a system 10 made in accordance with the present invention. The system 10 includes an electronic digital still camera 12. The camera is shown in block diagram form in FIG. 4.

The digital camera 12 produces digital images that are stored on the removable memory card 16. The camera is powered by rechargeable batteries 344 that connect to power supply 346 which supplies power to the camera circuits depicted in FIG. 4. A charger input 348 is provided as an external connection (which can be included as part of interface connection 342) so that the rechargeable batteries 344 can be recharged by an external power source. The digital camera 12 includes a zoom lens 312 having zoom and focus motor drives 310 and an adjustable aperture and shutter (not shown). The user composes the image using the optical viewfinder 341 and the zoom lens control 334, and then depresses the shutter button 332 to begin capture of a still image. The zoom lens 312 focuses light from a scene (not shown) on an image sensor 314, for example, a single-chip color CCD image sensor, using the well-known Bayer color filter pattern. The image sensor 314 is controlled by clock drivers 306. The zoom and focus motors 310 and the clock drivers 306 are controlled by control signals supplied by a control processor and timing generator circuit 304. The control processor and timing generator circuit 304 receives inputs from autofocus and auto-exposure detectors 308 and controls a flash 302. The analog output signal from the image sensor 314 is amplified and converted to digital data by the analog signal processing (ASP) and analog-to-digital (A/D) converter circuit 316. The digital data is stored in a DRAM buffer memory 318 and subsequently processed by a processor 320 controlled by the firmware stored in the firmware memory 328, which can be flash EPROM memory.

The processed digital image file is provided to a memory card interface 324 which stores the digital image file on the removable memory card 16. Removable memory cards 16 are one type of removable image digital storage medium, and are available in several different physical formats. For example, the removable memory card 16 can include memory cards adapted to the PCMCIA card interface standard, as described in the *PC Card Standard, Release* 2.0, published by the Personal Computer Memory Card International Association, Sunnyvale, Calif., September 1991. The removable memory card 16 can also be adapted to the Compact Flash interface standard, such as described in the *CompactFlash Specification Version* 1.3, published by the CompactFlash Association, Palo Alto, Calif., Aug. 5, 1998, or to the well-known Smart-Media, MemoryStick or SD memory card formats. Other types of removable image digital storage media, such as magnetic hard drives, magnetic tape, or optical disks, can alternatively be used to store the digital images.

The processor 320 performs color interpolation followed by color and tone correction, in order to produce rendered sRGB image data. The rendered sRGB image data is then JPEG compressed and stored as a JPEG image file on the removable memory card 16. The JPEG file uses the so-called "Exif" image format defined in "*Digital Still Camera Image File Format (Exif)*" version 2.1, July 1998 by the Japan Electronics Industries Development Association (JEIDA), Tokyo, Japan. This format includes an Exif application segment that stores particular image metadata, for example the date and time the picture was captured, the lens f/number and other camera settings, and image captions or comments that can be selected or entered by the camera user.

The processor 320 also creates a low-resolution "thumbnail" size image, which can be created as described in commonly-assigned U.S. Pat. No. 5,164,831 "ELECTRONIC STILL CAMERA PROVIDING MULTI-FORMAT STORAGE OF FULL AND REDUCED RESOLUTION IMAGES" to Kuchta, et. al., the disclosure of which is herein incorporated by reference. This thumbnail image has 160× 120 pixels, to conform to the DCF rules described later, and is stored in RAM memory 326 and supplied to the color LCD image display 14.

Figure 6:
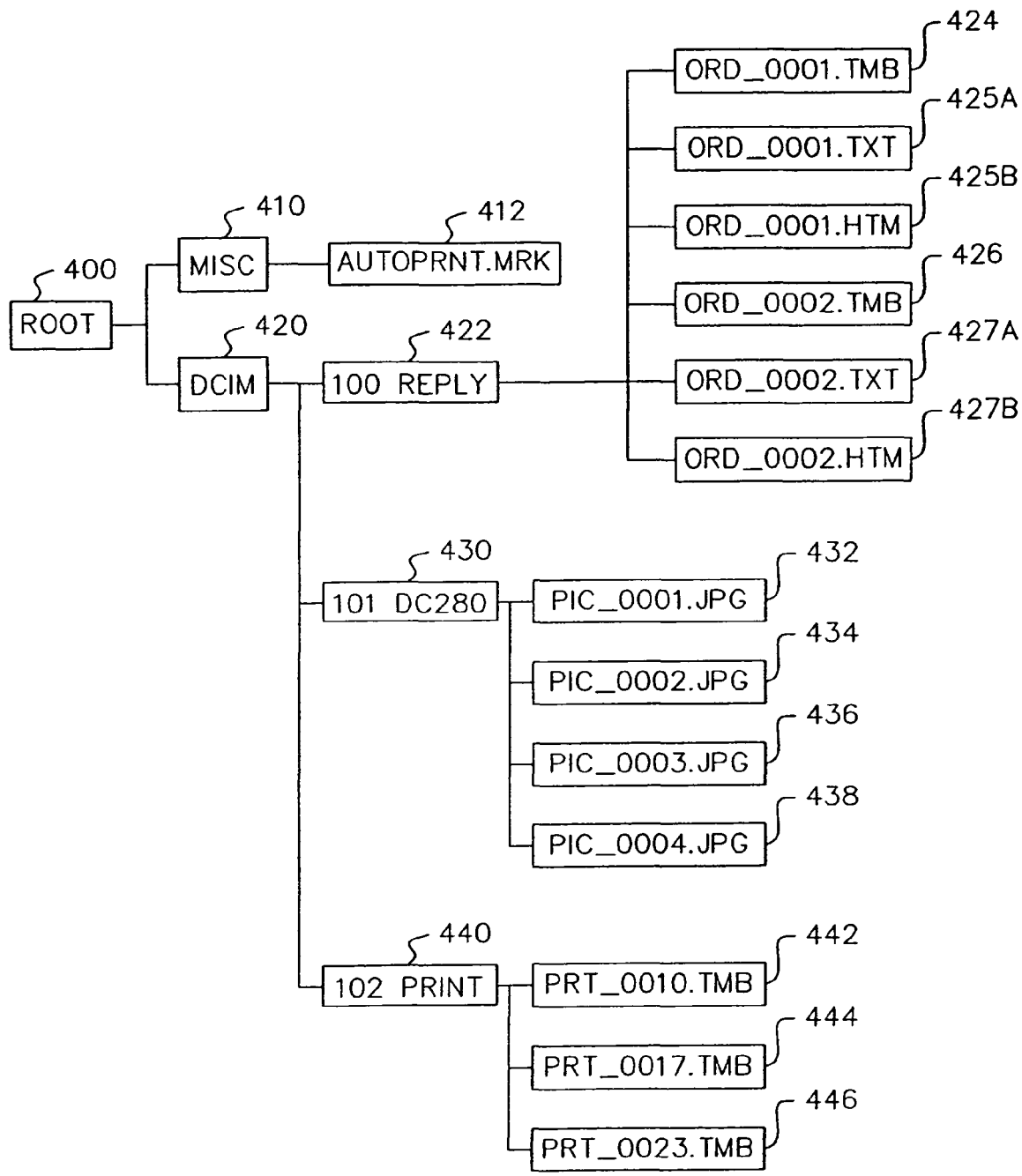
FIG. 6 illustrates the arrangement of files stored on a removable memory card by the camera and transmitting device.

The Exif image files, containing the JPEG compressed main image, thumbnail image, and the image metadata, are stored on the removable memory card 16 using a directory structure conforming to the so-called "DCF" rules defined in "*Design Rule For Camera File System*" version 1.0, Dec. 1998 by the Japan Electronics Industries Development Association (JEIDA), Tokyo, Japan. An example directory structure recorded on DOS formatted memory card 16 by the digital camera 12 and the communication device 20 is depicted in FIG. 6. Two directories are recorded under the root directory 400, MISC directory 410 containing a file 412 named AUTOPRNT.MRK and DCIM directory 420 which contains subdirectories 422, 430 and 440. File 412 is a Digital Printer Order Format (DPOF) file which specifies images to be printed, as will be described later. Subdirectory 430 is named 101DC280, to conform to the DCF rules, and contains four JPEG compressed Exif image files, PIC_0001.JPG 432, PIC_0002.JPG 434, PIC_0003.JPG 436, and PIC_0004.JPG 438. Files 432, 434, 436, and 438 are Exif image files captured by the digital camera.

Subdirectory 422 is named 100REPLY, to conform to the DCF rules. The purpose of subdirectory 422 is to provide a known location for the image processor 320 (see FIG. 4) to store confirmation files onto removable memory card 16 as the images stored by the digital camera 12 in subdirectory 430 are transmitted to the service provider 22. These confirmation files can be reviewed after the transmission is complete. The confirmation files stored in subdirectory 422 can include the thumbnail size JPEG compressed image confirmation files, file 424 named ORD_0001.TMB and file 426 named ORD_0002.TMB, the corresponding text confirmation files, file 425A named ORD_0001.TXT and file 427A named ORD_0002.TXT, or the corresponding HTML (hyper-text markup language) confirmation files, file 425B named ORD_0001.HTM and file 427B named ORD_0002.HTM, or a combination of these JPEG image files, text files, and HTML files. These confirmation files are sent to the removable memory card by the service provider. Files 424, 425A, 425B, 426, 427A, and 427B are recorded on the removable memory card 16 as the Exif images stored in subdirectory 430 are transferred to the service provider 22, as will be described later. The thumbnails and other files stored in subdirectory 422 are received from the service provider 22 and describe or depict the status of an order transmitted to the service provider.

Subdirectory 440 is named 102PRINT, to conform to the DCF rules. The purpose of subdirectory 440 is to provide a known location for image processor 320 (see FIG. 4) to store thumbnail image files onto removable memory card 16 as the full resolution images previously stored by the digital camera 12 in subdirectory 430 are transmitted to the service provider 22 and then deleted from the removable memory card 16. The deletion of the full resolution images from the memory card will not occur until verification of receipt has been established. Means such as check sums can be used to accomplish the verification. At a later time, the user can review the thumbnail image files stored in subdirectory 440 and decide to order additional prints of particular images, or other types of products. Because the full resolution images are retained by the service provider, only the user ID and image identifier (e.g. the image file name or number) need to be communicated to the service provider 22. Thus, high quality reprints can be obtained by using the full resolution image data previously transferred to the service provider 22. The image thumbnail files stored in subdirectory 440 are simply the 160×120 thumbnail images previously stored inside the image files stored subdirectory 430 (e.g. image files 432, 434, 436, or 438) as part of the Exif image file when the picture was captured. This thumbnail file is extracted from the main image file (e.g. file 432) when the particular file is transferred by communication device 20, and stored in subdirectory 440. Subdirectory 440 may contain a large number of these small thumbnail files, such as file 442 named PRT__0010.TMB, file 444 named PRT__0017.TMB, and file 446 named PRT__0023.TMB. Because of their small size, the removable memory card 16 can store a large number (e.g. hundreds or thousands) of thumbnail image files.

The graphical user interface displayed on the color LCD image display 14 is controlled by mode dial 336 and push buttons 360 shown in FIG. 1. The electronic camera 12 can also include a video output driver and connector (not shown) for displaying the captured images or the print status information on a TV (not shown). The user places the mode dial 336 in the "capture" position prior to capturing images. The user places the mode dial 336 in the "review" position in order to review the captured images (e.g. image files 432, 434, 436 and 438 in FIG. 6.) The user can review the image files and delete undesirable images using push buttons 360.

When the mode dial 336 is in the "place order" position, the user can decide which images to print, and how many copies to make. The camera creates an image utilization file, as described in commonly-assigned U.S. Ser. No. 09/004,046 filed Jan. 7, 1998 entitled "NETWORK CONFIGURATION FILE FOR AUTOMATICALLY TRANSMITTING IMAGES FROM AN ELECTRONIC STILL CAMERA" to Ward et. al., the disclosure of which is herein incorporated by reference. Using push buttons 360, the user provides instructions concerning whether to print all or some of the image files (e.g. files 432, 434,436, and 438 in FIG. 6) stored on memory card 16, and how many copies to make of each particular file. File 412, named AUTOPRNT.MRK, is an ASCII text file containing these instructions, and is known as a Digital Print Order Format (DPOF) file.

The user may also provide instructions for creating combination images such as album pages, as described in commonly-assigned U.S. Pat. No. 5,940,121 entitled: HYBRID-CAMERA SYSTEM WITH ELECTRONIC ALBUM CONTROL to McIntyre et. Al., the disclosure of which is herein incorporated by reference. In this case, the user controls 330 and color LCD image display 14 allow the user to group images that should be printed on the same album pages. In some embodiments, the camera can also include a user interface for inputting annotated text which can be added to album pages. The album-related data is stored in the DPOF file 412 using the DPOF vendor extension mechanism, and the DPOF file 412 is transmitted to the service provider 22 along with the appropriate images from subdirectory 430. The album-related data within the DPOF file 412 allows the service provider 22 to automatically print the images in an album-like format.

In a camera capable of digitally zooming and cropping an image file after it is captured, the thumbnail images may reflect the zoomed and cropped portion of the image. This may be achieved by storing thumbnails which only reflect the final zoomed and cropped image, or by overlaying a zoom and crop retical on the thumbnail image of the original (uncropped) image. The entire full resolution image may be sent to the service provider along with the cropping co-ordinates, or only the portion necessary for printing may be sent.

The user may establish a default order condition. The user may use push buttons 360 for selecting or modifying a default order condition. This default order condition may contain information on print size, print paper surface, selection of particular album page styles, number of copies, and many other selections. The camera may automatically assign these conditions to prints not specified otherwise by the user in the DPOF file. Alternatively, the default order condition may be stored by the service provider and used to perform the default services unless the DPOF file specifies otherwise. The user may specify the default order condition to the service provider by a number of means including a file created by the camera, a phone conversation, or a file created on a computer.

The user can also review the thumbnail image files stored in subdirectory 440. Using push buttons 360, the user reviews the thumbnail image files, (e.g. files 442, 444, 446 in FIG. 6) and selects one or more images that they would like to reprint. This might typically occur as the user shares images with friends or family by showing them the thumbnail image files on the color LCD image display 14. To order reprints, the user selects, using push buttons 360, which images to print, how many copies to make, etc. The Digital Print Order Format (DPOF) file 412 is then updated to include this print order, and to indicate via the image pathname, that the images to be printed are already stored at the service provider 22.

The mode dial 336 includes an "order status" position. This order status mode allows the user to review any confirmation files written by image processor 320 into the 100REPLY subdirectory 422 on removable memory card 16. The confirmation files in subdirectory 422 indicate the status of previous print orders made using this memory card. The confirmation files include thumbnail images (e.g. thumbnail image files 424 and 426 in FIG. 6) that can be viewed as standard images on any DCF compliant digital camera. These thumbnail images may include text messages, icons, etc. The confirmation files can also include text confirmation files (e.g. the ORD__0001.TXT file 425A and the ORD__0002.TXT file 427A) or html confirmation files (e.g. the ORD__0001.HTM file 425B and the ORD__0002.HTM file 427B) that can be viewed on a camera designed to support these file types. The text confirmation files 425A and 427A and the html confirmation files 425B and 427B may contain detailed information concerning order status, special pricing advertisements, etc., that the user can scroll through using user controls 330. These file types allow more detailed confirmation information to be conveyed in a small size file, compared to the JPEG thumbnail confirmation files 424 and 426. The user can review the confirmation files in 100REPLY subdirectory 422, and delete some or all of the confirmation files if desired, using push buttons 360 in FIG. 4. Alternatively, the processor 320 can automatically display any new confirmation files stored in the 100REPLY subdirectory 422 as soon as they are received from service provider 22. The user can review the confirmation files in 100REPLY subdirectory 422, and delete some or all of the confirmation files if desired, using push buttons 360.

An interface connection 342 can be used to connect between the interface 322 in the electronic camera 12 and the corresponding camera interface in the communication device 20. The interface connection 342 may conform to, for example, the well-know universal serial bus (USB) interface specification, or to many other standard interfaces. The interface connection 342 can alternatively be connected to a host computer (not shown), which can serve as an alternative communication device. The interface connection 342 is used to transfer images from removable memory card 16 to communication device 20. The interface connection 342 can also be used to transfer data from the host computer (not shown) to firmware memory 328 in camera 12. In particular, it can optionally be used to transfer phone numbers, e-mail addresses, Internet URLs, etc. to firmware memory 328, as described in previously cited U.S. patent application Ser. No. 09/004,046. In this case, when the user places the mode dial 336 in the "place order" position, the user can also decide to transmit some or all of the digital images to one or more e-mail addresses, or to upload the images to one or more web sites. The e-mail addresses, web site URLs, and image lists are recorded in the DPOF file 412 using the DPOF vendor extension mechanism. In addition, other types of photo products, such as a Picture CD 28 in FIG. 1 having digital image files stored thereon, photo albums, mugs, T-shirts, etc. may be optionally ordered from digital camera 12 by uploading the appropriate information from host computer (not shown) or service provider 22 to firmware memory 328, or by storing the appropriate information on removable memory card 16.

As illustrated by FIG. 1, after the image files (e.g. image files 432, 434, 436 and 438) and print utilization file (e;g. DPOF file 412) have been recorded by digital camera 12, the digital camera 12 is connected to communication device 20. The communication device 20 is designed to dock with the digital camera using the interface connection 342. The communication device 20 can include a recess 31 into which the digital camera 12 is placed, which also aligns an electrical connector (not shown) on the digital camera 12 with a mating connector (not shown) on the communication device 20 in order to provide the interface connection 342. Alternatively, an appropriate cable, such as a USB cable, can serve as the interface connection 342 between the digital camera 12 and the communication device 20.

When the digital camera 12 is connected to the communication device 20 using interface connection 342, the processor 320 in the digital camera 12 and the microprocessor 80 in the communication device 20 co-operate to transfer the DPOF file 412 (see FIG. 6) and the appropriate images from subdirectory 422 referenced by the DPOF file to the service provider 22. The communication device 20 is one type of communication device, and is designed to communicate with service provider 22 over a communication network 24. In the particular embodiment illustrated in FIG. 1, the communication network 24 comprises phone lines. However, it is to be understood that that the communication device may utilize any other type of communication network, including wireless networks, as will be described in reference to FIG. 2. The service provider 22 produces the appropriate goods and/or services which in the particular embodiment may comprise prints 26, picture CDs 28 having digital image files stored thereon, photoalbums, mug, T-shirts, and other items incorporating personal images. The ordered goods or services can then be returned or provided to the customer. In the case of goods, these are delivered to the customer, for example through the mail system.

The communication device 20 is a relatively simple to use, dedicated device for transferring images from digital camera 12 to service provider 22. The communication device 20 is shown in block diagram form in FIG. 5. The communication device 20 includes a low cost microprocessor 80 which is controlled by firmware stored in firmware memory 88 and a camera interface 84 which interfaces with interface 322 in digital camera 12 via interface connection 342. Firmware memory 88 can be Flash EPROM memory. The communication device 20 also includes a modem 82. The modem 82 is connected to a telephone connector 29, which is designed to be connected to a phone line in the same manner as a telephone and other similar type equipment. It should be noted that the microprocessor 80, modem 82, memory card interface 84 and firmware memory 88 can alternately be fabricated on the same integrated circuit.

The communication device 20 also includes two indicating lights 34 and 36. In the embodiment illustrated indicating light 34 is a green status light indicating that the digital data has been sent to the service provider and indicating light 36 is a red light that indicates that the data has not yet been transmitted to the service provider 22.

A power connector 32 is provided for providing electrical power to the power supply 86 within communication device 20. The power supply 86 may also supply power to the digital camera 12 for charging the rechargeable batteries 344 (see FIG. 4) via charger input 348. The charger input 348 of the digital camera 12 may be connected to the communications device 20 as part of interface connection 342, or using a separate electrical connector. The communication device 20 also includes a start button 38 which is be used to initiate operation of communication device 20 by the user. Alternately, the docking of the digital camera 12 can be automatically detected by camera interface 84, so that the start button 38 is not required.

The microprocessor 80 in the communication device 20 reads DPOF file 412 to determine which images need to be transmitted to the service provider 22. Additionally, the microprocessor 80 includes an internal clock (not shown) that is regulated in accordance with a standard time clock such that the transmission of digital data occurs at certain designated time periods. For example, data may be transmitted only at off hours, (e.g. during the middle of the night) when transmission rates are low and there is a relatively lower chance of disruption to the user in the use of the network system. It is of course understood that the communication device 20 may be programmed for allowing transmission during at any desired time period. A status light 40 may also be provided for indicating that power is being supplied to the communication device 20.

Figure 5:
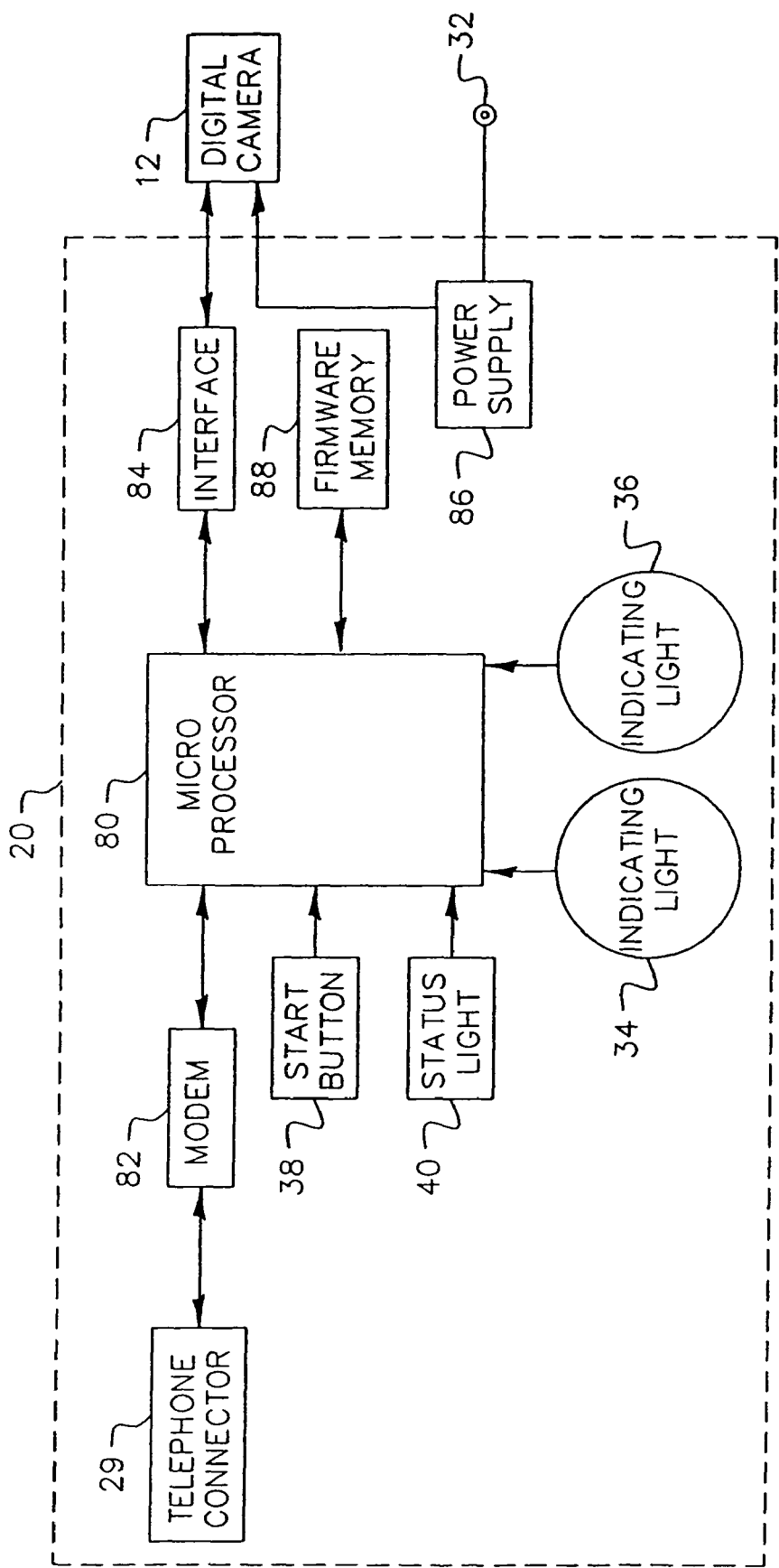
FIG. 5 illustrates in block form the transmitting device depicted in FIG. 1.

The communication device 20 may be simpler or alternately more complex, than the device depicted in FIG. 5. In order to minimize the cost and maintenance of the communication device 20, the firmware memory 88 in the communication device 20 or the firmware memory 328 in the digital camera 12 may be preprogrammed with a phone number of the service provider 22 which will be automatically accessed over the phone lines. Alternate or back-up phone numbers can be also programmed in the event that the first number called is busy or becomes inaccessible. However, this is transparent to the user as this may be automatically done by the software program used to operate communication device 20. This software-program, along with the appropriate phone numbers, can be stored in firmware memory 88, which can be a Flash EPROM memory.

Figure 7:
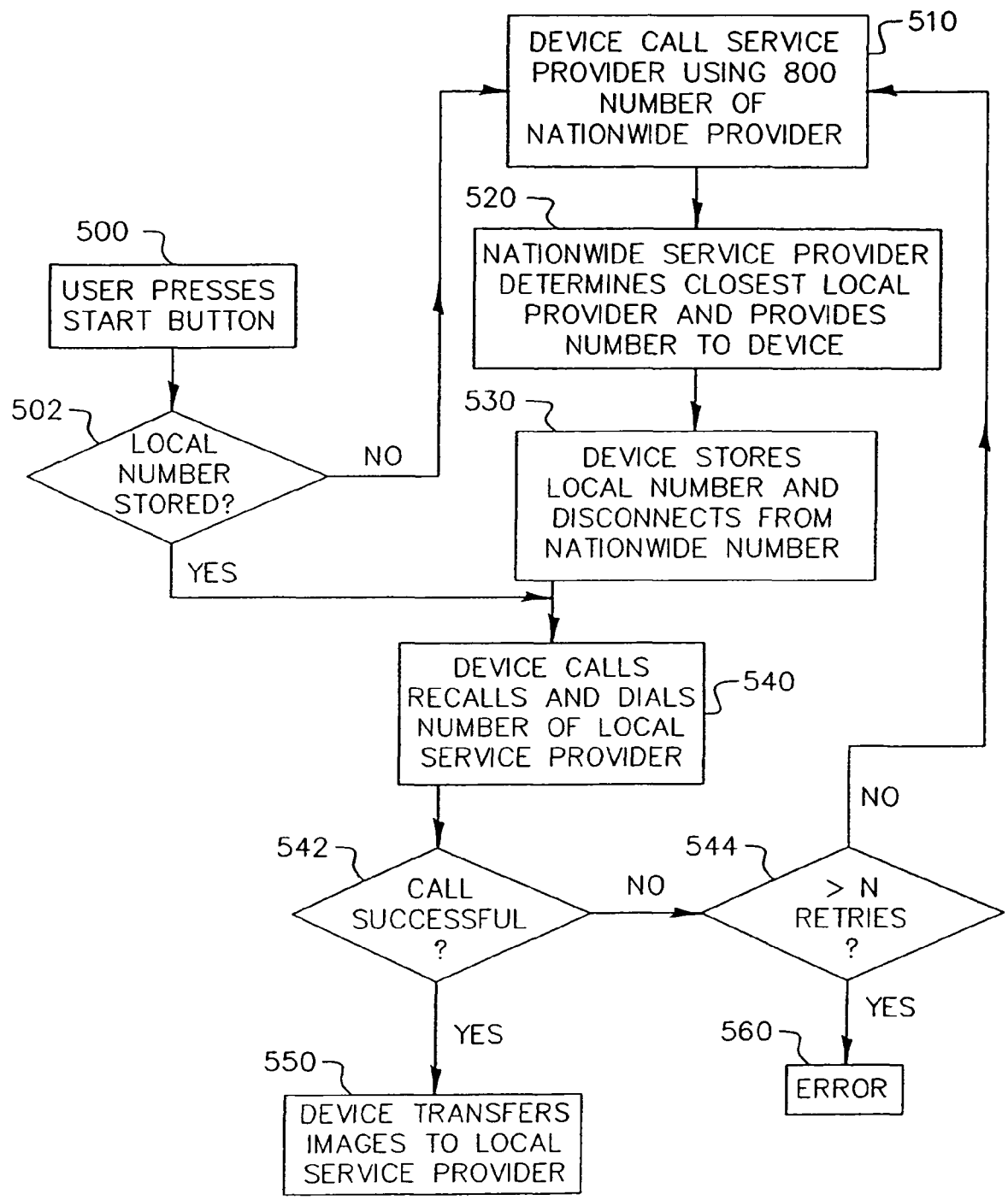
FIG. 7 is a flow diagram illustrating the method of automatically determining the phone number of the closest service provider.

Alternatively, the process illustrated in FIG. 7 may be used to determine the location of the nearest phone connection to a service provider. This is useful in the situation where the user is traveling (e.g. on vacation), and wants to transfer images to the service provider from various locations. Using a nearest service provider normally reduces the cost of the telephone call when transferring images, and shortens the shipping time. When the user presses the start button 38 in block 500, the processor 80 determines if there is a local number stored in the firmware memory 88 (block 502). The first time the communication device 20 is used, a local number is not stored. In this case, the processor 80 retrieves from firmware memory 88 a toll-free phone number (e.g. an "800" number), and dials the number in block 510. In block 520, the nationwide service provider receives the call and determines, using the local exchange information, the location of the communication device 20. The nationwide service provider then communicates the phone number of the closest local service provider to the communication device 20. In block 530, the communication device 20 stores the number of the local service provider in firmware memory 88 and disconnects from the nationwide number.

In block 540, the communication device 20 then dials the newly stored number of the closest local service provider. If in step 502 a local number has previously been stored, blocks 510, 520, and 530 are skipped, and the local number is immediately dialed in block 540. If the call is successfully answered in block 542 by the local service provider, the communication device 20 transfers the images to the local service provider in block 550, and then disconnects. In some cases, the call is not successful in block 542. For example, the communication device 20 may have been moved from one city to another, or the local service provider may be experiencing a service outage. In this case, the processor 80 determines how many "retries" have occurred (block 544) since the start button was pressed in block 500. If there have been less than a preset number N of retries (e.g. N=2), the communication device 20 repeats steps 510, 520, and 530 to obtain a new local service provider number.

If there have been more than N retries, the communication device provides a error indication to the user in block 560. This error indication can be provided by blinking the red indicating light 36, and by creating an error file, and storing the file in subdirectory 422 on removable memory card 16. The error file provides, using text and icons, the details of why the images could not be successfully transferred to a local service provider, and has the same structure as the confirmation files stored in subdirectory 422. Thus, the error file can include a thumbnail size JPEG compressed image files, similar to file 424 named ORD_0001.TMB, or a corresponding text confirmation file, similar to file 425A named ORD_0001.TXT, or a corresponding HTML (hyper-text markup language) confirmation files, similar to file 425B named ORD_0001, or a combination of these JPEG image files, text files, and HTML files. The error file can be reviewed by the user on the color LCD image display 14 of the digital camera 12.

In order for the customer to obtain the appropriate services from the service provider 22, the owner of communication device 20 registers the serial number of the device and provides an appropriate method for paying for the goods and/or services that are to be provided. For example, a payment identifier (e.g. a credit card or debit card number) of a customer account could be provided at time of registration. The customer's account that is debited can, of course, be located at a remote financial institution. Typically, as with credit cards, this financial institution will make payment to service provider 22. This is generally done by wiring the amount into the direct provider's account, generally an account established with another financial institution. Alternately, the customer could be billed or maintain an account which is billed on a periodic basis and would remain opened as long as the customer appropriately pays in an appropriate manner.

In one form of the present invention, the consumer buys the digital camera 12 and communication device 20, and signs up for service from service provider 22. This may be done via a network such as the Internet, using the method described in commonly-assigned U.S. patent application Ser. No. 09/534,471, filed Mar. 24, 2000, entitled "LEASING A CONFIGURED CAMERA SYSTEM", to Parulski, the disclosure of which is herein incorporated by reference. Alternatively, the customer may visit a retail establishment to buy or rent the digital camera 12 and the communication device 20. The customer may get the digital camera 12 and the communication device 20 free or at a reduced fee as part of a service plan. The consumer provides a payment identifier, phone number, and address to the service provider via the retail establishment. Alternatively, the network service provider may be responsible for billing, so the credit card number will be unnecessary.

After the consumer has docked the digital camera 12 into the communication device 20, the customer may press button 38 to initiate data transfer. Alternatively, the communication device 20 may wait to initiate data transfer until a predetermined time when transmission rates are low or use of the transmission network by the consumer is unlikely. The communication device 20 may make a call to the service provider immediately to receive a preferred time for transmission. This preferred time may be determined by the service provider on the basis of lowest transmission rates, volume of data being received at the service provider, or unlikely utilization of the transmission network by the consumer. The communication device 20 may also monitor consumer usage of the transmission network and choose transmission times (periods) which are unlikely to interfere with other consumer usage. If the communication device 20 should lose its time reference, it may call the service provider 22 to reprogram its clock. The device may also include an input device for correcting of the internal time clock of the communication device 20. Alternatively, the service provider 22 may check the communication device 20 to determine that the internal clock is correct. If the internal clock of communication device 20 is not correct, the service provider 22 may reprogram the communication device 20 with the correct time by providing appropriate commands.

In some embodiments, the communication device 20 is dedicated to a single service provider 22. When the communication device 20 calls the service provider 22, it provides a unique identification number (unique ID) to the service provider 22. This identification number is stored in firmware memory 88 and is not known to the user. The service provider 22 receives the identification number and then enables the communication device 20 to function in order to transfer images. In these embodiments, the communication device 20 is programmed to call only the number provided by the service provider 22. In the event that the service provider 22 changes phone lines by which the appropriate communication is to be made, the service provider can call the communication device 20 and download the new number to the communication device 20, which stores the new number in firmware memory 88. Since the service provider is the only entity that knows the unique identification number of the communication device 20, the number can not be inadvertently removed or changed.

If for any reason the interface connection 342 used to connect between the interface 322 in the electronic camera 12 and the corresponding camera interface in the communication device 20 is broken, the incomplete transmission must be addressed. The service provider may time out the connection after a specific time period. The camera will also need to end transmission after a time of no response from the service provider. When the interface is reestablished, transmission may be continued from the previous logical breakpoint which insures no image data has been lost. Additionally, if the user desires to use the camera, transmission may be terminated on the basis of termination conditions such as touching or moving the camera. Upon detecting termination conditions, the camera may send a termination message to the service provider and cease transmission. In this manner, the camera will be ready for use whenever the user desires.

Figure 3A:
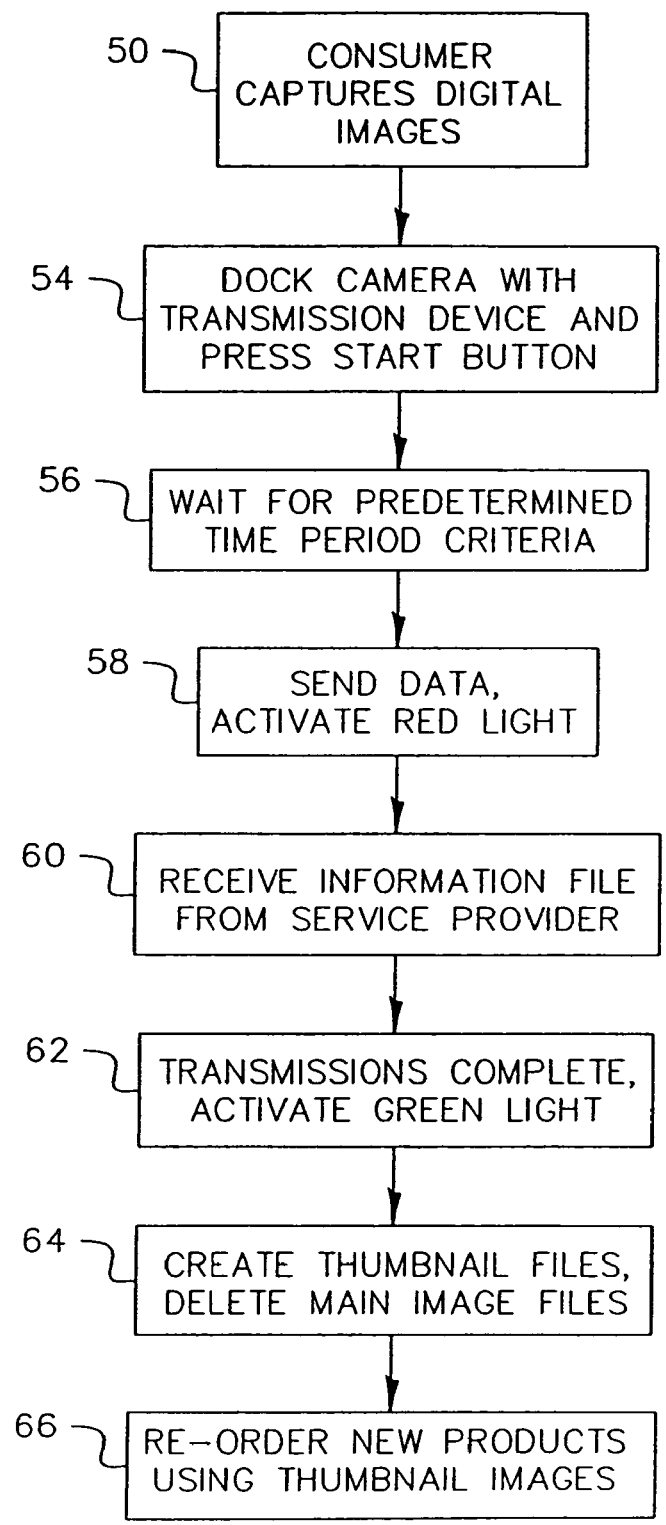
FIG. 3A is a flow chart illustrating the method of operation of the system of FIG. 1.

In order to more clearly understand the embodiment illustrated in FIG. 1, a description of the operation of digital camera 12 and communication device 20 in system 10 will now be discussed as illustrated by FIG. 3A. In block 50, the consumer captures appropriate digital images with the digital camera 12 which are stored on removable memory card 16 as Exif image files containing appropriate metadata. When the consumer has completed capturing of the images and creating an appropriate DPOF order file 412 in FIG. 6, at block 54 the digital camera 12 is connected (e.g. docked) with the communication device 20 and the start button 38 is activated. Alternately, the insertion of the memory card can be automatically detected, so that the start button 38 is not needed.

Thereafter, the communication device 20 will remain dormant at block 56 until the predetermined time period criteria has been met for transmitting of the data to the service provider. For example, if the communication device 20 has been programmed to transmit the digital images and DPOF file 412 during the time period from 12 Midnight to 3 in the morning, the communication device 20 will remain dormant and then at block 58 will send the data at the appropriate time. The red light will be maintained as long as the images have not yet been transferred. In the unlikely event that the consumer needs the phone while data transmission is being conducted, transmission will terminate. This information can be noted by communication device 20 and when the phone line frees up, the continued transmission can be automatically re-instituted at the point at which it was stopped.

At block 60, the service provider 22 downloads one or more confirmation files to the communication device 20, which records these confirmation files on removable memory card 16. These confirmation files can include thumbnail image files (e.g. files 424 and 426) that are displayed on the color LCD image display 14 on the camera when the user places the mode dial 336 in the "order status" position, as described earlier in relation to FIG. 4. The confirmation thumbnail image files (e.g. files 424 and 426) can contain text and icons to acknowledge how many images have been received, and what good/services are to be provided. The confirmation thumbnail image files (e.g. files 424 and 426) can also include other information, such as how much the order will cost, the expected arrival time, and other product offerings, including promotional offers.

Upon completion of transmission of the device at block 62, the green indicating light 34 is activated. At block 64, following successful transmission to the service provider 22, the thumbnail images from the Exif image files in subdirectory 430 (see FIG. 6) are transferred to subdirectory 440 as appropriately named thumbnail files, so that additional prints can be ordered in the future. The digital image files are retained by the service provider 22 for a period of time (e.g. 1 year) or indefinitely, depending on the service arrangement. The full resolution image files in subdirectory 430 and the DPOF file 412 are deleted from removable memory 16, thus freeing up most of the memory contained on removable memory 16 for use by the camera 12. Alternatively, the digital image files and associated data may be retained on the memory card until deleted by the user.

At block 66, the user reviews the thumbnail images stored in subdirectory 440 during block 64. The user selects particular images of interest, and orders photo products (e.g. reprints, PictureCD, mugs, T-shirts) using these images. Since the full resolution image has been previously uploaded to the service provider 22, only the product information and image identifier need to be communicated from the camera 12 to the service provider 22. This enables the user to show their friends and family previously uploaded images, using display 14 of digital camera 12, and then order extra prints or other photo products without having to retain the full resolution digital images on the removable memory 16.

Figure 2:
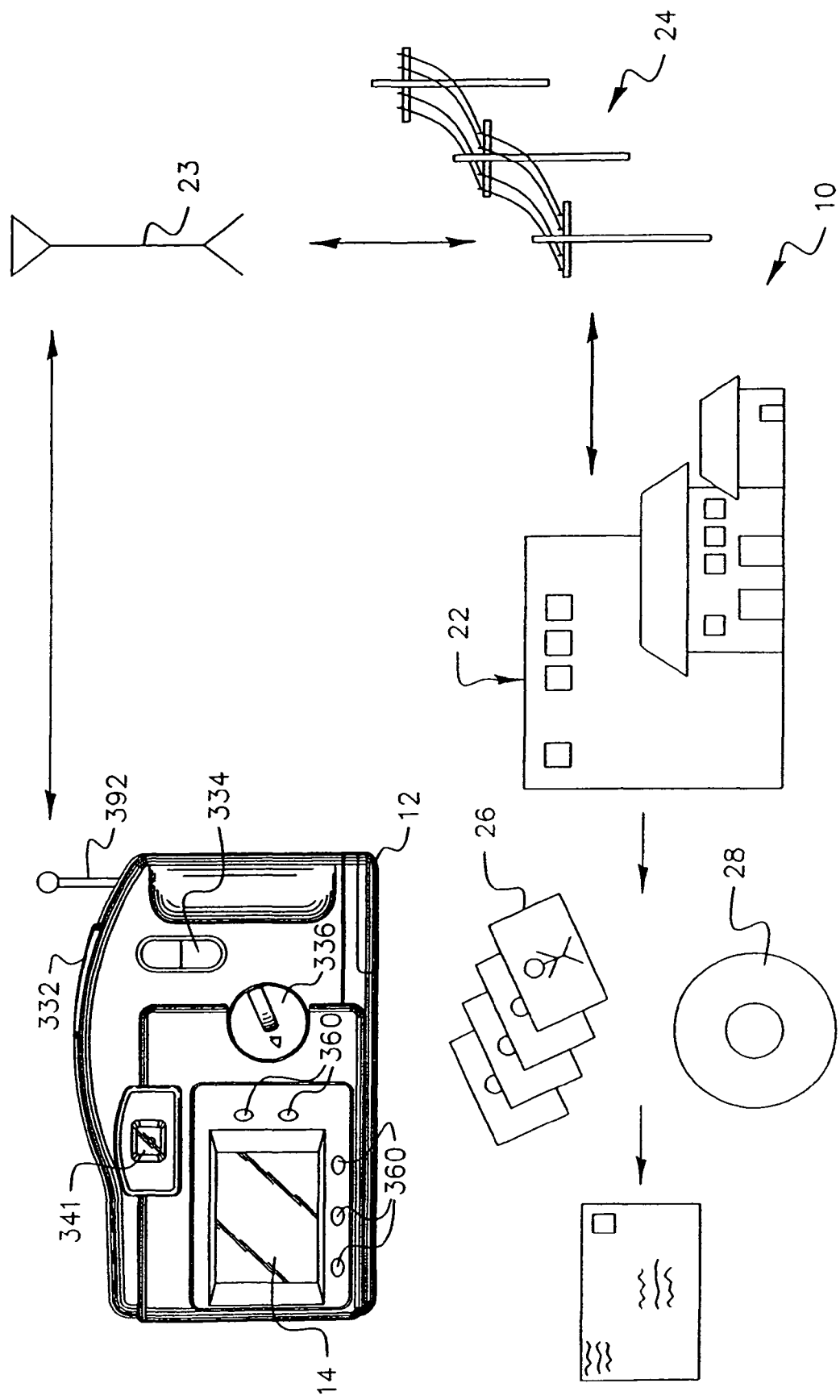
FIG. 2 illustrates in block form another system and apparatus made in accordance with a second embodiment of the present invention.

In an alternative embodiment depicted in FIG. 2, the digital camera 12A includes a cellular modem 390 (see FIG. 4) connected to a RF antenna 392, so that a separate communication device 20 is not necessary. The digital camera 12 communicates with a cellular RF antenna tower 23 and associated equipment that connects to telephone communications network 24 in order to communicate with service provider 22.

The digital images stored on the memory card 16 are automatically transferred from the digital camera 12 to the service provider 22 via the cellular modem after several images (e.g. after four images) have been captured by the digital camera 12. As a result, the capacity of the removable memory 16 can be greatly reduced. Alternatively, the removable memory 16 can be replaced by a smaller internal (non-removable) memory.

Figure 3B:
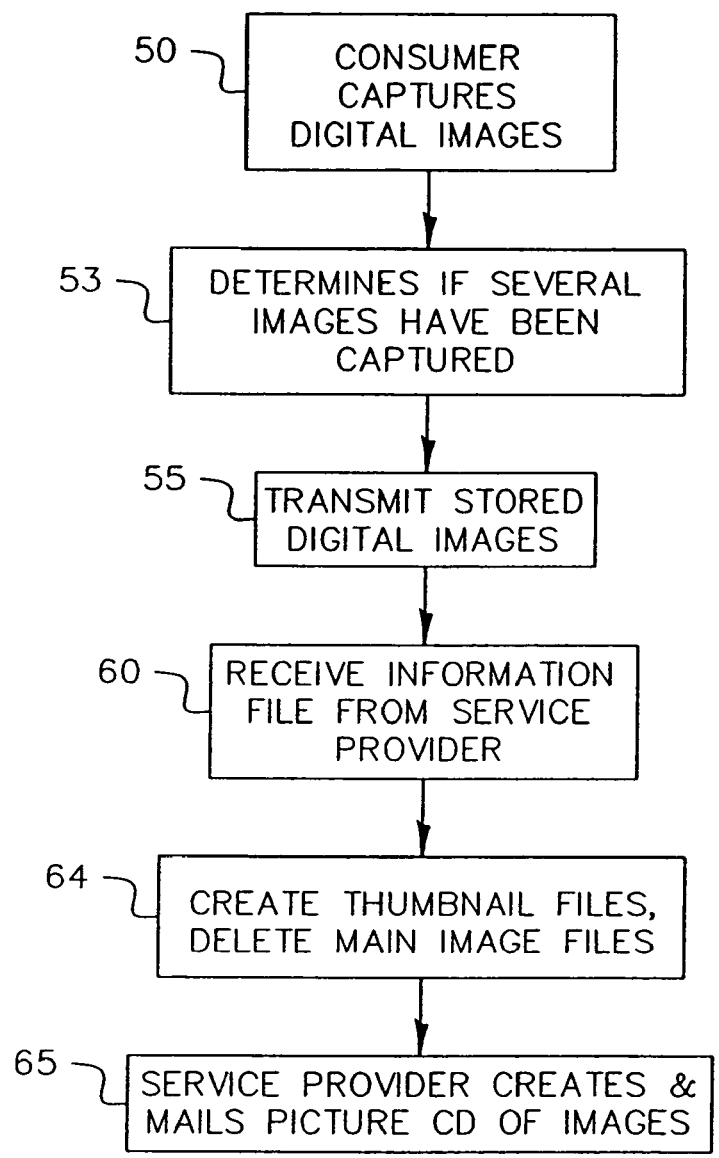
FIG. 3B is a flow chart illustrating the method of operation of the system of FIG. 2.

In order to more clearly understand the embodiment illustrated in FIG. 2, a description of the operation of digital camera 12 and communication device 20 in system 10 will now be discussed as illustrated by FIG. 3B. In block 50, the consumer captures appropriate digital images with the digital camera 12 which are stored on removable memory card 16 as Exif image files containing appropriate metadata. In block 53, the image processor 320 in the digital camera 12 determines when a factory default (or alternatively a user predefined) number of images have been captured (e.g. after each image is captured, or after 4 images have been captured, or after 10 images, etc.).

In block 55, after the proper number of digital images have been captured and stored in subdirectory 430 (see FIG. 6), the image processor in the digital camera 12 initiates transfer of the stored captured images via the cellular modem 390. The phone number called is the phone number of the local service provider stored in the firmware memory 328 of digital camera 12. Alternatively, the method described earlier in relation to FIG. 7 can be used. In this case, an 800 number of a nationwide service provider is used to determine the closest local service provider.

At block 60, the service provider 22 transfers confirmation files to the digital camera 12. As described earlier, these confirmation files can include one or more confirmation thumbnail image files, text files, and/or HTML files, which the image processor 320 records on removable memory 16 in subdirectory 422. These confirmation thumbnail image information files (e.g. files 424 and 426) are displayed on the color LCD image display 14 on the camera when the user places the mode dial 336 in the "order status" position, as described earlier in relation to FIG. 4. The confirmation thumbnail image files (e.g. files 424 and 426) can contain text and icons to acknowledge how many images have been received, how much the order will cost, the expected arrival time, and other product offerings, including promotional offers. Each time a group of images is transferred, a new confirmation thumbnail image file may be created containing status information for all of the transfers for a set period of time (e.g. all of the transfers for that day) so that the user does not need to review a large group of confirmation thumbnail image files.

At block 64, following successful transmission to the service provider 22, the thumbnail images from the Exif image files in subdirectory 430 (see FIG. 6) are transferred to subdirectory 440 as appropriately named thumbnail files, so that additional prints may be ordered in the future. The digital image files are retained by the service provider 22 for a period of time (e.g. 1 year) or indefinitely, depending on the service arrangement. The digital image files in subdirectory 430 and the DPOF file 412 are deleted from removable memory 16, thus freeing up most of the memory contained on removable memory 16 for use by the camera 12.

At block 65, the service provider produces a PictureCD write-once optical disc, or other type of digital image data recording using magnetic or optical media. The PictureCD is then mailed to an address supplied by the user when the user initiated the service. This may be done on a calendar basis (e.g. every month or every year) or after a specific number of digital images (e.g. after 200 images) have been transferred from the digital camera 12 to the service provider 22. In addition, the service provider 22 may make the digital images available to the user via an Internet web site.

The invention has been described in detail with particular reference to certain preferred embodiments thereof, but it will be understood that variations and modifications can be effected within the scope of the invention. The present invention being defined the claims that follow.

PARTS LIST 10. system
12. camera
14. image display
16. memory card
20. communication device
22. service provider
23. antenna tower
24. communication network
26. prints
28. Picture CD
29. telephone connector
31. recess
32. power connector
34. indicating light
36. indicating light
38. start button
50. block
53. block
54. block
55. block
56. block
58. block
60. block
62. block
64. block
66. block
80. microprocessor
82. modem
84. interface
86. power supply
88. firmware memory
302. flash
304. timing generator circuit
306. clock drivers
308. auto-exposure detectors
310. focus motors
312. zoom lens
314. image sensor
316. converter circuit
318. DRAM buffer memory
320. processor
322. interface
324. memory card interface
326. RAM memory
328. firmware memory
330. user controls
332. shutter button
334. zoom lens control
336. mode dial
341. optical view finder
342. interface connection
344. batteries
346. power supply
348. charger input
360. push buttons
390. cellular modem
392. antenna
400. root directory
410. MISC directory
412. file
420. DCIM directory
422. subdirectory
424. file
425A. file
425B. file
426. file
427A. file
427B. file
430. subdirectory
432. JPEG compressed Exif image file
434. JPEG compressed Exif image file
436. JPEG compressed Exif image file
438. JPEG compressed Exif image file
440. subdirectory
442. file
500. block
502. block
510. block
520. block
530. block
540. block
542. block
544. block
550. block
560. block

What is claimed is:

1. A method for ordering image products or services with respect to stored digital images at a remote location utilizing a communication network comprising:
    creating a high resolution image file for an image captured on a device;
    transferring a copy of the high resolution image file to a remote service provider over a communication network;
    storing a reduced resolution image file corresponding to the high resolution image file on the device;
    displaying a reduced resolution image corresponding to the reduced resolution image file on the device; and
    ordering goods or services with respect to the displayed reduced resolution image using the corresponding transferred copy of the high resolution image file, wherein creating the high resolution image file further comprises creating the high resolution image file of an image captured on a wireless device.

2. The method of claim 1, wherein ordering goods or services further comprises transmitting an identifier associated with the displayed reduced resolution image corresponding to the transferred high resolution image file to the remote service provider.

3. The method of claim 1, wherein storing the reduced resolution image file further comprises storing the reduced resolution file on removable storage medium.

4. The method of claim 1, wherein creating the high resolution image file further comprises creating the high resolution image file of an image captured on a camera.

5. The method of claim 1, wherein transferring the high resolution image file further comprises transferring a high resolution digital image file.

6. The method of claim 1 further comprising providing confirmation from the service provider that the high resolution image file has been transmitted to the service provider.

7. The method of claim 6 wherein providing the confirmation further comprises providing a confirmation using low resolution images.

8. The method of claim 6 wherein providing the confirmation from the service provider further comprises providing the confirmation using a text file.

9. The method of claim 1, wherein transferring the copy of the high resolution image file further comprises transferring the high resolution image file having cropping coordinates.

10. The method of claim 1, wherein transferring the copy of the high resolution image file further comprises transferring a portion of the high resolution image file.

11. The method of claim 2, wherein transmitting the identifier further comprises transmitting the identifier indicating selected services and indicating the high resolution image file to the service provider.

12. The method of claim 1 further comprising deleting the high resolution image file from the device.

* * * * *